Feb. 24, 1970   N. S. LIEPTZ   3,496,636
KEY CUTTING MACHINE WITH PRESELECTED DEPTH GAUGING
Filed May 15, 1968   6 Sheets-Sheet 1
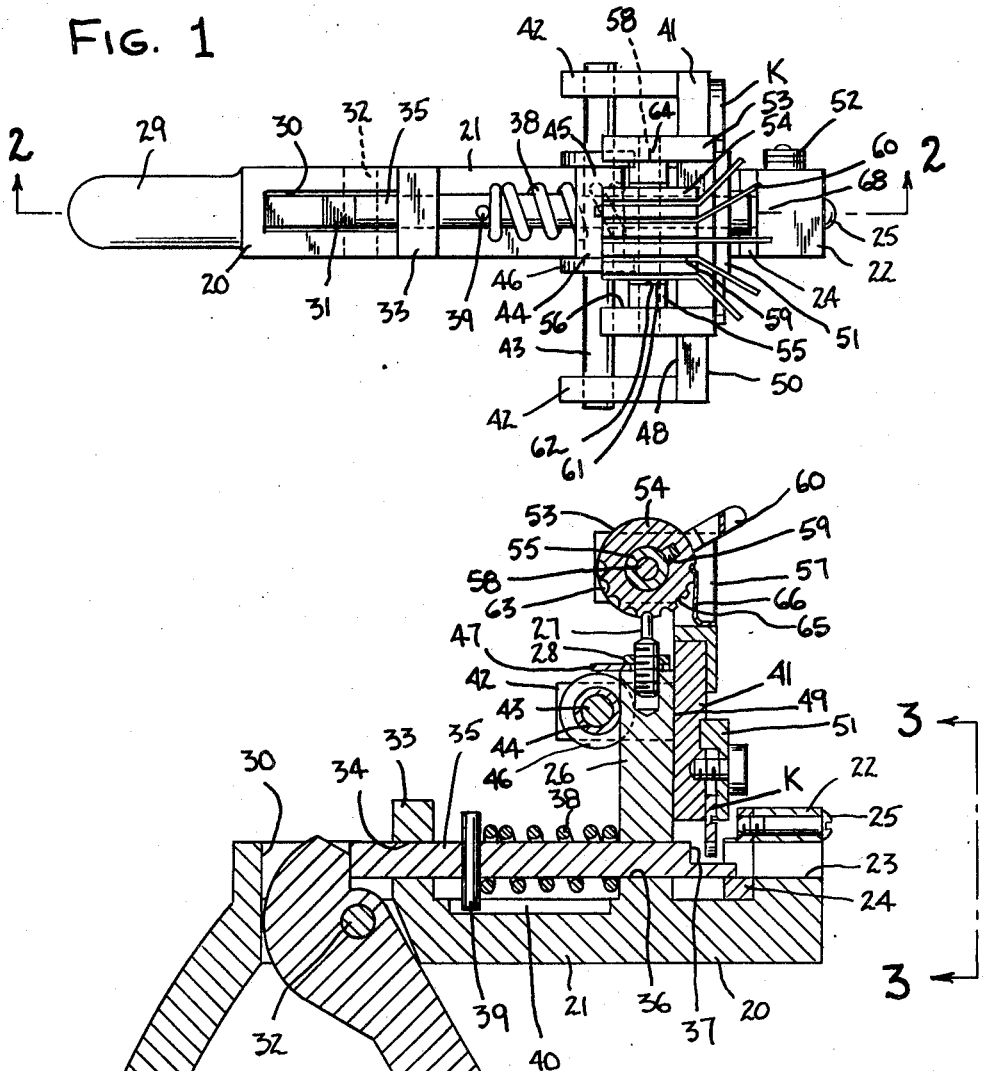
FIG. 1
FIG. 2
INVENTOR.
NATHAN S. LIEPTZ
BY
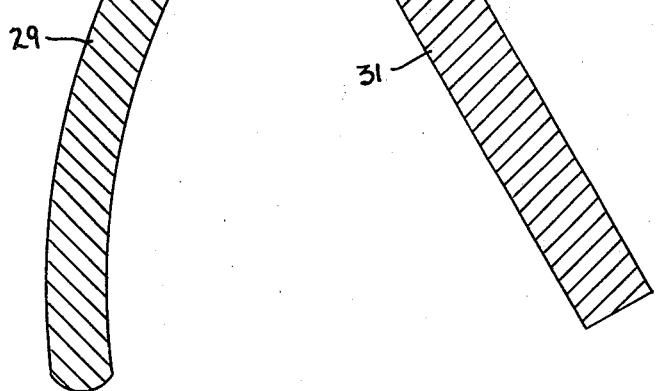

INVENTOR.
NATHAN S. LIEPTZ

Feb. 24, 1970 — N. S. LIEPTZ — 3,496,636
KEY CUTTING MACHINE WITH PRESELECTED DEPTH GAUGING
Filed May 15, 1968 — 6 Sheets-Sheet 3

INVENTOR.
NATHAN S. LIEPTZ
BY

INVENTOR.
NATHAN S. LIEPTZ

Feb. 24, 1970     N. S. LIEPTZ     3,496,636
KEY CUTTING MACHINE WITH PRESELECTED DEPTH GAUGING
Filed May 15, 1968     6 Sheets-Sheet 6

INVENTOR.
NATHAN S. LIEPTZ

United States Patent Office 3,496,636
Patented Feb. 24, 1970

3,496,636
KEY CUTTING MACHINE WITH PRESELECTED DEPTH GAUGING
Nathan S. Lieptz, Beachwood, Ohio, assignor to Curtis Noll Corporation, Cleveland, Ohio, a corporation of Ohio
Filed May 15, 1968, Ser. No. 729,281
Int. Cl. B25f 3/00
U.S. Cl. 30—131     16 Claims

ABSTRACT OF THE DISCLOSURE

A machine for cutting key blanks, preferably using a manually operated punch or cutting die, which utilizes adjustable depth gauges in association with a movable key blank supporting member for varying the depth of the cuts on the key blank in accordance with a known or determinable code pattern. The height of the key blank supporting member relative to the cutting tool is established by the sequential engagement of a finger or guide pin with the series of adjustable gauging elements. Automatic traverse of the key blank may be obtained by a pawl and ratchet mechanism or similar traversing means which are responsive to the stroke or manipulation of the key cutting machine. The extent of incremental traversing movement of the key blank can be varied to conform to different pre-established spacings between the cuts on various types of key blanks, by adjustment of the length of stroke which actuates the traversing or spacing mechanism. The spacing of the gauge elements themselves can be fixed or adjustable.

BACKGROUND OF THE INVENTION

The invention is directed to the cutting of a key blank for the purpose of providing a replacement or additional key for the user. It is known in the art to utilize key duplicating machines which use the original key as a pattern for duplicating the cuts of the key on a conforming key blank which is engaged by a revolving cutter wheel in a pattern established by the original key.

It is also known in the art to provide power or manually operated machines which do not utilize an original key for purposes of patterning the cuts on a replacement key blank, but utilize key code books or other available information designating the depth and sequence of cuts on the original key for the purpose of making like cuts on the replacement key blank. In this type of machine, conveniently referred to as a "code cutter," depth-setting fixtures are used in association with the machine and a depth of cut is set each time that the key blank is moved to the next cutting or notching position. This requires the operator of the machine to adjust the depth setting on the machine before each separate cut. See, for example, U.S. Patent No. 2,626,663 entitled, "Key Cutting Machine."

My invention improves upon the latter type of key cutting machine, as it permits the entire code of depth cuts for a specific key to be set on the machine by individually adjustable gauging elements before any cuts are made, so that the key cutting operation can proceed without the necessity, as in the prior art, of setting a coded depth of cut on the machine after each individual cut has been made.

SUMMARY OF THE INVENTION

In my invention a plunger or punch type of key cutting die is provided which is preferably manually operated through hand lever means. The key blank to be cut is disposed in the path of movement of the punch, so that as the punch traverses the key a cut is made in the key blank. The depth of cut in the key blank is established by the elevation of the key with respect to the cutting punch. This elevation, in turn, is established by gauging elements in association with a fixed guide or finger which maintain the key blank supporting member or carriage at selected degrees of elevation in relation to the cutting punch as the sequence of cuts are made.

The key blank and its support member are traversed or indexed so that the key blank is moved longitudinally in predetermined linear increments to provide a series of spaced cuts along its length. The depth gauges are preset in accordance with known depth-of-cut information or codes so that the entire sequence of depth cuts is set into the cutting machine before the first cut is made.

The key blank supporting member is made vertically movable and can be so moved manually, either directly or mechanically, in a predetermined limit of stroke which will actuate a pawl and ratchet traversing mechanism to index the supporting member from one key cutting position to the next. The extent of this vertical movement or stroke of the key supporting member can be selectively adjusted to change or vary the increment of spacing between cuts to accommodate the operation of the machine to varying designs of key spacings.

The depth gauging elements can be preassembled in fixed spaced relationship for a specific design or type of key. In such case, several interchangeable gauge assemblies of this type would be provided, each of which would have a different predetermined spacing to conform to a particular key or group of keys. Alternatively, the gauging elements can be made transversely movable relatively to each other so that the spacing between individual gauging elements can be adjusted to provide the necessary spacing changes to conform to the spacings of the different types of keys to be cut from time to time.

Although the key cutting machine is primarily intended for use as a code cutter, which does not require the use of an original key for duplication purposes, if such an original key is available it can be used in lieu of the depth gauges and the machine can then be used as a duplicator rather than as a code cutter.

BRIEF DESCRIPTION OF THE DRAWINGS

FIG. 1 is a top plan view of a key cutting machine embodying the features of my invention, portions thereof being broken away to show certain details.

FIG. 2 is a cross-sectional view, taken as indicated on line 2—2 of FIG. 1.

DESCRIPTION OF THE PREFERRED EMBODIMENTS

Figure 3:
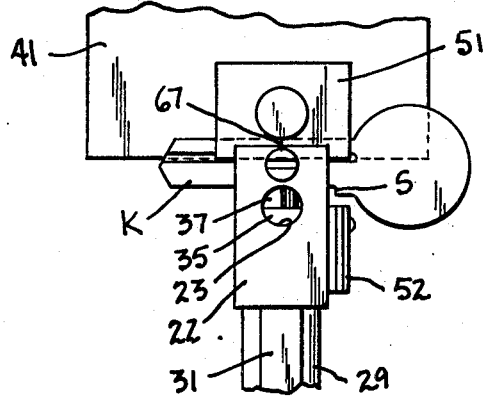
FIG. 3 is a cross-sectional view, taken as indicated on line 3—3 of FIG. 2.

Referring more particularly to FIGS. 1, 2 and 3 of the drawings, I have shown a sturdy cast metal frame 20 having a longitudinally extending body portion 21 which terminates at one end in an upstanding anvil support 22 having a longitudinally extending clearance hole or bore 23 provided therein. An apertured female die or anvil 24 is secured to the rearward face of the anvil support 22, as by means of the threaded fastener 25.

Spaced rearwardly of the anvil 24 on an intermediate portion of the body 21 is another upright portion 26 of substantially rectangular cross-section, which serves as a support element for a depth gauging guide or finger 27 which is threadedly secured in the upright 26 at the upper end thereof. A lock nut 28 can be loosened to permit some vertical adjustment of the height of the finger 27, if such adjustment becomes necessary or desirable by reason of wear or other causes.

At its rearmost end, the frame 20 terminates in a downwardly extending handle or gripping portion 29. Forwardly of the handle 29, the body 21 is provided with a hollowed out or cut out portion 30 for the reception of a lever 31 which is pivotally secured to the body as by pin 32 for swinging movement within the recess or cutout 30. A bearing block 33 is provided on the body forwardly of the recess 30 and is apertured as at 34 to slidably receive a cylindrical punch or die 35 which extends through an aperture 36 in the upright 26 so as to guide it in its longitudinal movement. The forward end of the punch 35 is formed to provide a notching or cutting edge 37 which will cut the desired notches in a key blank as the cutting edge 37 traverses the key blank and enters the apertured anvil 24. The punch is biased toward a rearward position by a coil spring 38 which is mounted on the punch between the rearward face of the upright 26 and a diametrically extending pin 39 which is provided on the punch. The lower end of the pin 39 rides in a longitudinally extending groove 40 in the body 21, so as to prevent axial rotation of the punch during its reciprocating movement.

The upper end of the lever arm 31 engages the rearward end of the punch 35 and will cause the punch to move longitudinally forwardly in opposition to the spring 38 when the lever arm is drawn rearwardly by hand toward the handle 29. When the pressure or force on the long arm of the lever 31 is released, the spring 38 will cause the punch to be retracted rearwardly from its cutting position, as well as restoring the lever 31 to its original position.

A key blank supporting member 41 is provided in the form of a plate which is disposed vertically between the upright 26 and the anvil 24 and which is provided with a pair of horizontally spaced rearwardly extending journal arms or trunnions 42. The trunnions support an axle 43 on which is slidably and rotatably mounted a flanged roller 44 whose cylindrical body portion 45 rides on the rearward vertical face of the upright 26 and whose spaced flange portions 46 provide abutments on either side of the upright 26 to prevent transverse movement of the roller 44 relatively thereto. A transversely projecting pin or abutment 47 is provided on the upright 26 in the path of movement of the roller 44 in order to limit its upward extent of travel and prevent the support plate 41 from being lifted off the guiding upright 26. The rearward face 48 of the support plate 41 is disposed parallel with and closely adjacent to the forward face 49 of the upright 26, so that the upright serves as a guide for the vertical movement of the plate 41 during the manipulation of the cutting machine The opposite face 50 of the support plate 41 is provided at the lower end thereof with a suitable key blank securing means 51, here shown as a simple screw-operated clamp. Alternatively, the key blank securing means could be in the form of a carriage designed specifically for the particular key blank to be mounted thereon and retained in a slot provided in the plate 41. For a more detailed disclosure of this form of key securing means, reference is made to the aforementioned U.S. Patent No. 2,626,663. A key blank K can be releasably secured in the clamping fixture 51 in position to be cut by the cutting edge 37 of the punch 35. Each key blank K is provided with a shoulder S which serves as a reference point or location from which the spacing of the cuts can be gauged. Inasmuch as different types and designs of key blanks are not uniform in the extent of spacing of the first cut on the key blank from the shoulder reference point, I have provided a plurality of shoulder locator elements 52 which are pivotally secured on one side of the anvil support 22 so as to be individually swingable into abutment with the lower edge of the key blank K for the purpose of positioning the shoulder S in the proper transverse position for the cutting of the key blank. It will be noted that successive locator elements 52 are spaced further outboard from the cutting edge 37 of the punch so that when the proper locator element 52 is positioned against the underside of the key blank and the key blank shoulder is brought into abutment therewith, before the key is clamped, the key blank will be properly positioned. Each of the locator elements 52 carries suitable markings or identifying designations correlating it to the specific types or models of key blanks for which it is to be used. When a particular locator element has served its function, gravity will cause it to swing downwardly and out of the way of the further movement of the key blank. Although I have referred to the elements 52 as being shoulder locator elements, it is to be understood that there are some types of key blanks in which the tip of the key is used as a locator reference, rather than the shoulder of the key. To provide for such cases, a set of tip locator elements (not shown) which are comparable in function to the locator elements 52 could be substituted for the shoulder locator elements or could be added to the cutting machine by mounting them on the opposite side of the upright 22. The function of the locator elements 52 is to properly locate the key blank in relation to the punch 35 for proper spacing of the first cut on the key in relation to some reference point, and it is essentially immaterial whether the reference point with which the locator elements are used is the shoulder of one type of key blank or the tip of another type of key blank.

A read-out depth gauge assembly 53 is secured to the rear face of the plate 41 adjacent the top edge thereof. For purposes of illustration, it will be assumed that there are five spaced cuts required to be made in the lower edge of the clamped key blank K. Each of the cuts to be made could be any one of five different depths which vary from each other in increments of .025 inch, starting with zero, which represents a no-cut. The first cut or cut No. 1 is assumed to be the cut closest to the shoulder S of the key blank and the remaining cuts may be assumed to be equally spaced from each other in increments of .125 inch.

In the assumed case, the depth gauge assembly 53 is provided with five identical discs 54 mounted for individual rotation on a tubular axle 55 which, in turn, fits closely within a recess 56 provided in the body 57 of the gauge assembly and is supported therein by a shaft 58 which is removably mounted in the body 57 and traverses the hollow bore of the axle 55. Each disc 54 has a spacer element 59 secured thereto for rotation therewith. The spacer elements 59 are of such predetermined thickness as to space the adjacent discs 54 from each other in conformity with the spacing of the cuts required to be made on the key blank, in this instance .125 inch. In addition, the spacers 59 are each provided with an extension or handle 60 which, in the assembly, are bent so as to diverge from each other to provide more convenient access to them. The assembly of discs 54 and spacers 59 is retained in predetermined position on the hollow axle 55 by means of snap rings 61 which fit into annular grooves 62 provided on the axle 55. It is to be noted that the location of the annular groove 62 on the axle 55, in relation to the first cut to be made on the key blank, is predetermined for the purpose of obtaining proper registry of the disc 54 which is to be utilized as the depth gauge for the number 1 cut on the key blank.

It is quite probable that the same arrangement and spacing of the discs 54 can be utilized for different types of key blanks, but that the spacing from the shoulder of the key blank to the number 1 cut on one style of key blank may be somewhat different than it is on another style of key blank. In such instance, an assembly of the discs 54 and spacers 59 on the axle 55 would be provided, in which the annular groove 62 would be located in a different position on the axle so as to provide a different spacing for the number 1 cut in relation to the shoulder of the key blank. This assembly could be interchanged with the above-described assembly by removing the shaft 58 to permit removal of the disc assembly from the recess 56 and then replacing it with another disc assembly which is mounted on the shaft 58 when it is reinserted. Similarly, other disc assemblies having different spacings or depth increments for other types of key blanks would be available for mounting in the recess 56 to meet the requirements of the particular style of key blank to be cut. The hollow axle 55 would in all of these various disc assemblies be of the same length so as to be snugly received within the recess 56, but its annular grooves 62 would be located and spaced from each other to obtain proper registry of the first and subsequent cuts for the particular style of key blank being cut. For example, about eight of these different but interchangeable disc assemblies would suffice to meet the location and depth requirements of all the different styles of automotive key blanks which are in common use for American cars.

Each of the discs 54 is provided with a plurality of peripheral pockets or recesses 63. In the assumed example, there would be four of such pockets to provide for the four depths of cuts to be made on the key, in addition to the zero cut, which is ordinarily designated by the code number 1, with successively deeper cuts being designated by the code numbers 2, 3, 4 and 5 where there are five depths of cuts in the code arrangement. The shallowest of the recesses 63 would have a wepth of .025 inch in the assumed example, the next deeper code 3 cut would have a depth of .050 inch, the code 4 cut would have a depth of .075 inch, and the depth of the recess 62 for the code 5 cut is .100 inch. The finger 27 is of a size and configuration to be received in any one of the several recesses 63 that is in registry therewith.

Each of the discs is provided on its periphery with markings of the code designations 1, 2, 3, 4 and 5 and an index mark 64 is provided on the body 57 to permit alignment of a selected code number on each of the discs with the index mark. The code numbers are appropriately located so that the corresponding pocket or recess 63 will be in proper alignment with the finger 27 when the selected code number is aligned with the index mark 64.

Each of the discs 54 is also provided with a series of peripheral detent notches 65 and the periphery of each of the discs is engaged by a leaf spring 66 secured to the body 57 and adapted to be received in one of the detent notches 65 for the purpose of yieldably restraining the disc against unwanted rotation.

The operation of the device is as follows. Assume that the desired key blank to be cut has been clamped on the key blank support plate 41 by the key securing means 51 and properly located longitudinally by means of the locator elements 52. The disc assembly appropriate to the cutting of the particular key blank K has been mounted in the body of the depth gauge assembly 53 by means of the removable shaft 58. It has been determined from appropriate sources that the desired key has a code of 31324, which means that the first cut is to be made to the code 3 depth, no cut is to be made in the second cutting position, a code 3 cut is to be made in the third cutting position, a code 2 cut is to be made in the fourth cutting position and a code 4 cut is to be made in the final cutting position. By use of the handles 60, each of the discs is rotated to its proper depth of cut position so that, when all the discs have been set, the code 31324 can be read directly on the discs opposite the index mark 64. The depth of each cut for the entire series of five cuts has now been set.

The plate 41 is now moved upwardly in relation to the upright 26 and shifted transversely in relation to the flanged roller 44, by means of the axle 43, so as to bring the first of the discs 54 into alignment with the finger 27. The plate 41 is then moved vertically downwardly until its downward movement is limited by the entry of the end of the finger 27 into the peripheral recess 63 which corresponds to the code 3 depth of cut. The handle 29 and lever 31 are then gripped and drawn together to cause the cutting edge 37 of the punch 35 to traverse the key blank and cut a notch in the edge thereof. The lever 31 is then released to permit retraction of the punch 35. The key blank support plate 41 is again elevated and shifted transversely to bring the disc 54 representing the second cut into registry with the finger 27. The plate 41 is again lowered to the limit of its movement as determined by the engagement of the finger 27 with the periphery of the appropriate recess 63 on the disc. Inasmuch as the second depth of cut is code 1, the key blank will be maintained in a sufficiently elevated position so that the subsequent operative actuation of the punch 35 will not create any cut in the edge of the key. Although I have referred to the code 1 cut as "no cut," in many instances this code number would represent a definite cut, even though it might be quite shallow. The cycle is again repeated for each of the depth-gauging discs 54 until all five positions of cuts have been completed. The key blank can now be released and any burrs removed and the key is ready for use.

Although I have stated that it is not necessary to provide a depth recess 63 for a code 1 cut, it will be understood that where the code 1 represents a cut, a depth gauging surface or recess would be provided, and it is even desirable when code 1 represents no cut, as in the example given. Then, the recess for the code 2 cut would be, in the present example, .025 inch deeper than the recess for the code 1 cut. Such a recess for the code 1 cut is desirable not only from the standpoint of maintaining a more positive engagement between the finger 27 and the disc, but also from the standpoint of permitting more precise regulation of the depth of cut in relation to the form of universal key blank clamping means 51, which would ordinarily use the longitudinal groove in a key as a location means for clamping it.

It will be understood that when the locator elements 52 are used, the clamp 51 and its associated plate 41 will first be aligned in a predetermined uniform transverse position relatively to the axis of the punch 35 by any suitable means such as registry marks 67, 68 on the clamp and anvil support, respectively, so that the required transverse correlation between the depth gauge assembly 53 and the shoulder S of the key blank can be established.

Although I have described the device as being operated entirely manually, it will be understood that the principles of operation embodied therein can be adapted to power mechanism so as to eliminate manual operation, if desired. Power means could be utilized for the operation of the punch, as well as for the elevating and traversing operation of the key blank carrier. Under such circumstances, it would be feasible to replace the cutting punch 35 with a power driven cutter or abrading wheel, if desired.

The depth gauge discs 54 have been described as having the gauging recesses 63 on the periphery of each disc. Inasmuch as these recesses 63 are progressively deeper or shallower, as the case may be, my invention also contemplates that the recesses 63 could be eliminated in favor of forming the periphery or edge of each of the discs 54 with a predetermined radially decreasing cam-like surface which would provide the progressive change which is desired in gauging the depth cuts. However, the use of the recesses 63 is preferable both from the standpoint of convenience and from the standpoint of accuracy, so I have shown this as the preferred embodiment rather than any of the other forms of depth-gauging surfaces which could be provided on each of the discs 54.

Figure 4:
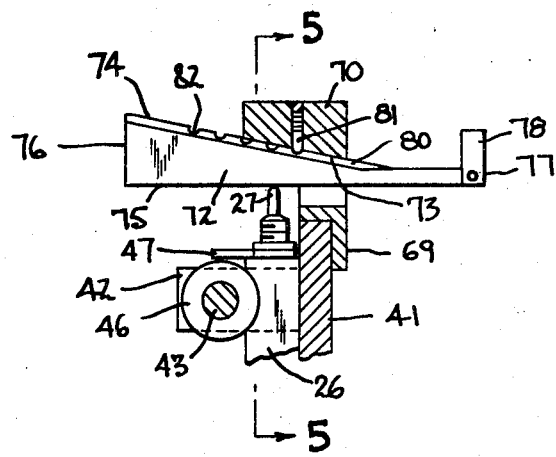
FIG. 4 is a fragmentary cross-sectional view similar to FIG. 2, but showing a modified form of the invention.
Figure 5:
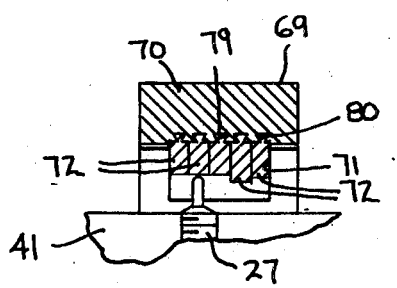
FIG. 5 is a cross-sectional view, taken as indicated on line 5—5 of FIG. 4.

Referring to FIGS. 4 and 5 of the drawings, I have shown a modified form of my invention in which I utilize a read-out depth gauge assembly 69 in lieu of the previously described depth gauge assembly 53. The depth gauge assembly 69 includes a camming body 70 which is secured to the upper portion of the plate 41 and is provided with a central recess 71 to accomodate a plurality of depth gauging bars 72. The top wall 73 of the recess is angularly inclined to provide a camming or guide surface for the upper angularly inclined surface 74 of the gauge bar 72.

Each of the gauge bars 72 is a relatively thin or narrow piece of metal of rectangular cross-section, but of wedge-shaped configuration by reason of the aforementioned angularly inclined edge 74 relatively to the horizontally extending opposite edge 75. The gauge bar thus tapers in a vertical direction so that it is widest or of greatest vertical dimension at its rearward edge 76. The forward end 77 of the depth gauge bar can be suitably formed to provide a finger grip 78. I have shown five depth gauge bars 72, corresponding in number to the five depth gauging discs 54 previously described.

The top wall 73 of the body 70 is provided with five transversely spaced longitudinally extending undercut keyways 79 which are adopted to slidably receive the longitudinally extending keys 80 which are formed on the upper edge 74 of each of the gauge bars. The gauge bars 74 can each be slidably moved relatively to the body 70 so as to project the lower edge 75 of the gauge bar into the path of the previously described gauging guide or finger 27.

Inasmuch as the gauge bars 72 are wedge-shaped and are slidably secured to the body 70, the elevation or height of the edge surface 75 of the gauge bar will progressively change as the gauge bar is moved rearwardly or forwardly relatively to the body 70. The widening taper of the upper edge 74 of the gauge bar is in a rearward direction so that the surface 75 is in its uppermost or most elevated level when the gauge bar 72 is in its rearwardmost position of adjustment. Conversely, when the gauge bar is in its forwardmost position of adjustment, the surface 75 is at its lowest level relatively to the supporting body 70.

As in the case of the previously described discs 54, each of the gauge bars 72 can be provided with suitable indicia for registry with the end of the block 70 to indicate varying depths of cuts for the key blank K.

The operation of the modified form of device of FIGS. 4 and 5 is substantially the same as previously described with reference to FIGS. 1–3. The key blank K is clamped into a selected position on the plate 41 and each of the gauge bars 72 is then moved to a selected position representing the desired cut to be made in that transverse position on the key blank K. After all the gauge bars have been set to their desired positions representing the desired depth of cut as determined by code, the code can be read directly from the indicia on the gauge bars before any cuts are made on the key. After it has been determined that the setting of the gauge bars reads correctly in accordance with the desired code of cuts, the key punch 35 is manipulated in the manner previously described to make the proper depth of cut in the first cutting position. The abutment of the guide finger 27 with the undersurface 75 of the selected gauge bar 72 will determine the depth of cut. The plate 41 and the associated depth gauge assembly are then shifted transversely to the next position of cut so that the guide finger 27 will engage the next adjacent gauge bar 72 to determine the depth of cut in the number 2 cutting position as the guide finger 27 abuts the undersurface 75 of the selected gauge bar. The cut is made and the operation is repeated for each of the cuts to be made until the cutting of the key has been completed.

Inasmuch as the depth gauging position of each of the gauge bars is infinitely variable within its overall range of depth gauging movement, any particular depth gauge assembly is not necessarily limited to a particular style or model of key blank, but could be used for all key blanks having the same transverse spacing between cuts even though the incremental pattern of the depth of cut may vary from one style of key blank to another. However, if the multiple use for different styles of key blanks is not of great importance, then it is preferable for single purpose use for one style of key blank, that a detent arrangement be provided on the depth gauge assembly both for convenience and accuracy. Such an arrangement is shown in the form of a spring loaded plunger or ball 81 mounted in the body 70 adjacent each of the keyways 79 and adapted to yieldably engage one or the other of a plurality of sockets 82 provided on the upper edge 74 of each gauge bar in predetermined longitudinally spaced relationship corresponding to the incremental depths of cut of a particular style or model of key blank.

Figure 6:
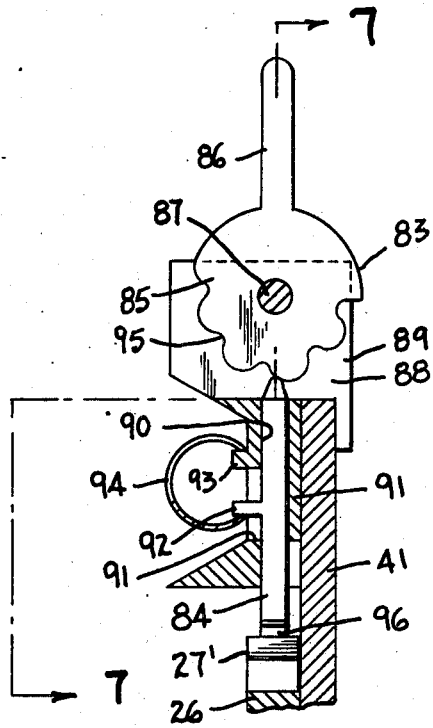
FIG. 6 is a fragmentary cross-sectional view similar to FIG. 2, and showing a further modification of the invention.
Figure 7:
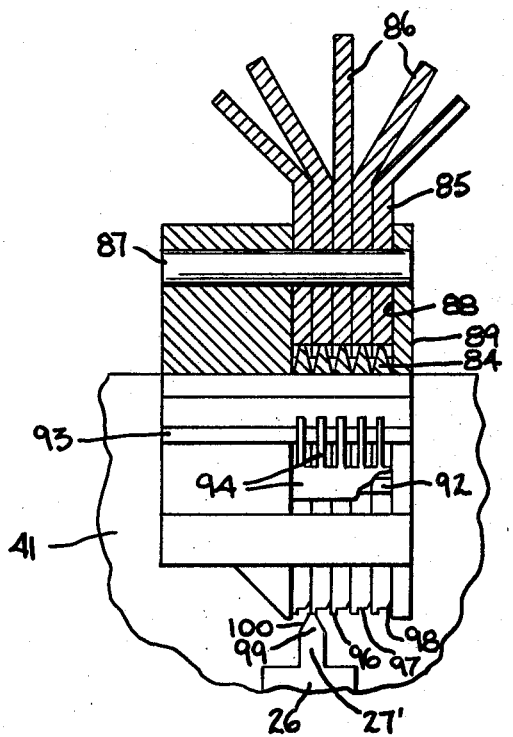
FIG. 7 is a fragmentary cross-sectional view, taken as indicated on line 7—7 of FIG. 6.
Figure 8:
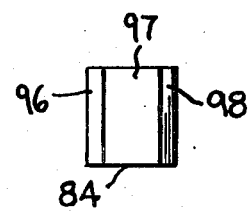
FIG. 8 is an enlarged detail view of the end of one of the depth gauge bars shown in FIG. 6.

When such single purpose depth gauge assemblies are used, a plurality of depth gauge assemblies would be provided to encompass a variety of styles or models of key blanks and the appropriate depth gauge assemblies 69 would be removably mounted on the plate 41 for each particular style or family of key blank styles which are to be cut. Referring now to FIGS. 6–8 of the drawings, I have shown another modified form of depth gauge assembly 83 which utilizes vertically mounted depth gauge bars 84 which are progressively positioned by individual camming discs 85 so as to establish selected levels of abutment with the guide finger.

A plurality of the discs 85, provided with manipulating handles 86, are mounted for rotation on an axle 87 which traverses a recess 88 in a supporting body 89 which is removably secured to the upper edge of the plate 41. As in the previously described examples, five of such discs 85 may be provided and retained within the recess 88. A depth gauge bar 84 is provided for each of the camming discs 85 and projects vertically downwardly below the disc 85 in the plane thereof. The gauge bars 84 are slidably movable vertically within the body 89 and are guided in such movement between an inner wall surface 90 of the body 89 and the surface of a plate 91 which is secured to the body 89 during assembly.

The wall 90 is apertured, as at 91, to provide an opening for the projection of a boss 92 which is provided on each of the gauge bars 84. An exterior portion of the wall 90 adjacent to the aperture 91 is provided with a transversely extending embossment or ridge 93 which serves as a retainer or anchor for one end of a circular leaf spring 94 whose other end engages the boss 92. The spring 94 thus serves to yieldably retain the upper end of the bar 84 in abutment with its adjacent camming disc 85. The edge of each disc 85 is provided with a camming surface 95, here shown as a combination of camming surface and detent pocket, by means of which the rotation of the disc 85 displaces the gauge bar 84 vertically to a selected extent corresponding to a desired depth of cut on the key blank K. Suitable numerical indicia can be provided on each of the discs 85 for registry with a mark on the body 89 to permit read out of the code cuts, as in the manner previously described.

The lower end of the gauge bar 84 is formed to permit continuous traverse of the gauge bars by the guide finger. For this purpose, a depending camming projection or lip 96 depends from the gauging surface 97 of the lower end of the bar and the opposite edge of the gauging surface is also beveled as at 98. The guide finger 27' is provided with a tip 99 of substantially triangular cross-section, having the oppositely directed sloping surfaces 100 for engagement with the lower ends of the gauging bars, particularly the camming lips 96 thereof.

In operation, the discs 85 are rotated to vertically displace the gauging bars 84 in opposition to the springs 94 to establish the desired depth of cut which each of the gauge bars will define, in accordance with the code cut pattern for the particular key blank to be cut. After the depth of cut pattern has been set, as can be determined from directly reading the indicia members on the discs 85, the cutting punch is operated for each transverse position of cut, as the plate 41 and its associated depth gauge assembly 83 is shifted transversely to bring each of the plurality of gauging bars 84 into the path of abutment of the guide finger 27'. By reason of the configuration of the lower ends of the gauging bars and the form of the tip 99 of the coacting guide finger, it is not necessary to elevate the plate 41 for the purpose of shifting it transversely after each cut on the key blank, as such transverse shift can be accomplished while the tip of the guide finger remains in abutment with the successive gauging bars.

Figure 9:
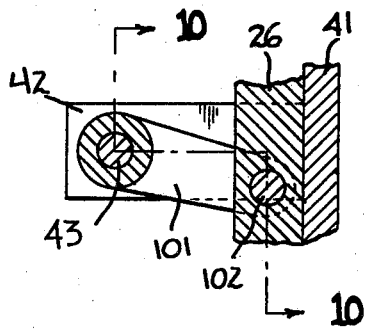
FIG. 9 is a fragmentary cross-sectional view similar to FIG. 2 showing a further modification of the invention.
Figure 10:
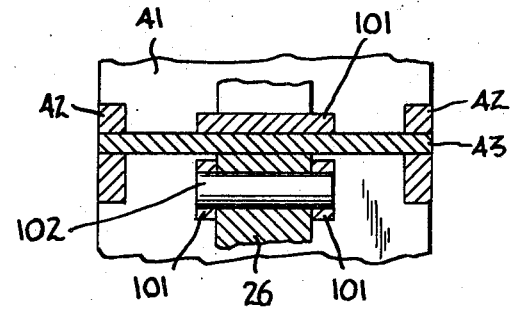
FIG. 10 is a cross-sectional view, taken as indicated on line 10—10 of FIG. 9.

In FIGS. 9 and 10 of the drawings, I have shown a modified form of guide arrangement for the carrier plate 41 in which the vertical linear movement of the plate 41 as imposed thereupon by the engagement of the roller 44 abutting the upright 26, is replaced by a combination of linear and pivotal or swinging movement of the plate 41 which permits more convenient access to the plate for the purpose of clamping the key blank thereon, which may be desired under certain circumstances.

In this modified mounting arrangement, a pair of integrated transversely spaced rocker arms 101 are pivotally secured at their forward ends to the upright 26, as by the pin or axle 102. The rearward ends of the integrated rocker arms are slightly and pivotally traversed by the axle 43 whose ends are secured in the rearwardly extending trunnions 42 of the plate 41.

With this modified form of mounting for the plate 41, the plate 41 can be elevated vertically to permit the necessary transverse shifting of the plate as the respective cuts in the key blank are made. Such movement is permitted by the slight upward and forward arcuate movement of the rocker arms 101 in response to such elevation of the plate 41. However, when the plate 41 has been elevated sufficiently to permit its lower edge to be clear of the anvil support 22, the plate 41 can be tilted bodily upwardly about the axis of the axle 43 so that the key clamping means 51 is readily accessible for insertion or removal of a key blank. In other respects the operation of the device is essentially the same as previously described and any one of the previously described depth gauge assemblies could be used with this modified form of mounting for the plate 41.

Figure 11:
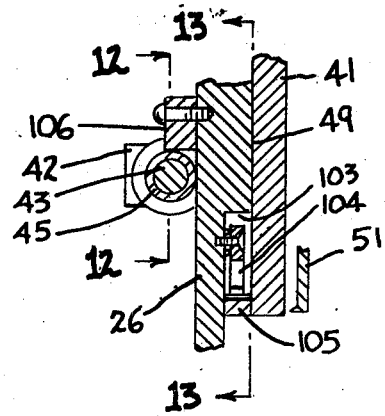
FIG. 11 is a fragmentary cross-sectional view showing the traversing mechanism of a modified form of the invention.
Figure 13:
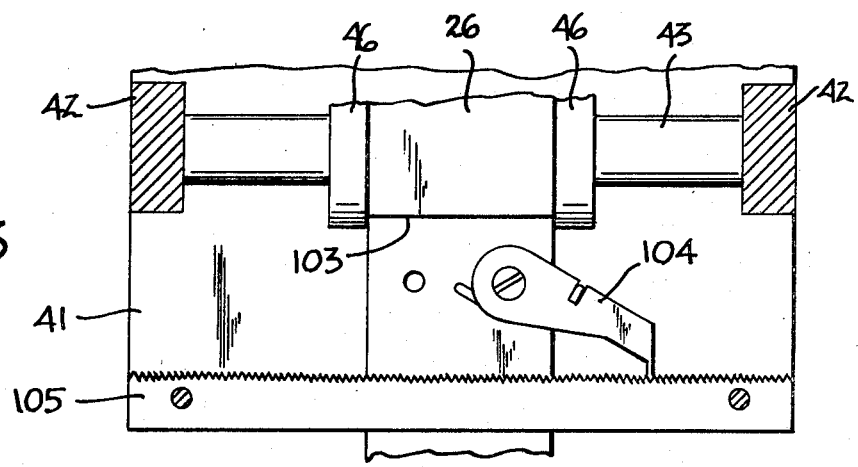
FIG. 13 is an enlarged cross-sectional view taken as indicated on line 13—13 of FIG. 11.
Figure 12:
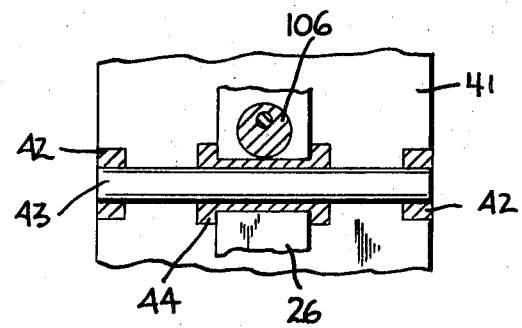
FIG. 12 is a cross-sectional view, taken as indicated on line 12—12 of FIG. 11.

In FIGS. 11–13 of the drawings, I have shown an automatic form of traversing mechanism which can be utilized to shift the carrier plate mechanically in response to the vertical displacement of the plate, so that predetermined incremental spacing between the cuts on the key can be obtained.

In this modified form of the invention, the forward face 43 of the upright 26 is recessed as at 103 to accommodate a spring-loaded pawl 104 which is pivotally secured for swinging movement in a plane substantially parallel to the plane of vertical movement of the plate 41. Secured to the carrier plate 41 adjacent to the lower edge thereof is a horizontally extending ratchet bar 105 which is engaged by the spring-loaded pawl 104. The teeth of the ratchet bar 105 are closely spaced or pitched, e.g. .025 inch, so as to permit a range of single tooth or multitooth actuations in response to the vertical movement of the plate 41. It will be evident that as the plate 41 is moved downwardly from an elevated position, the ratchet bar 105 will be lowered with respect to the pawl 104, which will remain in engagement therewith but will ride over one or more of the ratchet teeth, depending upon the stroke or extent of vertical downward movement of the plate 41. Conversely, when the plate 41 is elevated after a cut has been made in the key blank, the pawl will remain in engagement with the ratchet bar and will cause the ratchet bar and its associated plate 41 to be shifted transversely as a consequence of the angular displacement of the pawl in response to the upward stroke of the plate 41. If the extent or magnitude of the vertical stroke of the plate 41 is maintained substantially uniform, this arrangement will cause uniform increments of transverse shifting of the plate 41 after each cut has been made in the key blank.

In order to maintain such uniformity of stroke of the plate 41, as well as to permit adjustment of the stroke to vary the transverse spacing increment, I have provided a pivotally mounted eccentric stop button 106 on the rear face of the upright 26 in the path of movement of the roller 44. The stop button 106 serves the same function as the previously described abutment finger 47 in limiting the upward movement of the roller 44 and thus establishing the length of vertical stroke of the carrier plate 41 when it is lifted. However, due to the eccentric mounting of the stop button 106, it provides an adjustable stop by means of which the maximum permitted stroke of the carrier plate can be selectively adjusted and varied with a consequent change in the extent of transverse displacement of the plate 41 which is effected by the pawl and ratchet mechanism. By calibrating the stop button 106 and providing suitable indicia or markings, predetermined uniform transverse spacings responsive to the maximum stroke of the vertical movement of plate 41 can be selected and obtained.

In the operation of this modified form of the device, any one of the previously described forms of depth gauge assemblies could be utilized and would be set to the appropriate code cutting pattern. The stop knob 106 would then be rotated to a preselected position corresponding to the transverse spacing of the cuts which is to be established for the particular style of key blank to be cut. The plate 41 is then shifted transversely until the guide finger 27 is aligned with one of the depth gauge devices and the first cut is then made by manipulation of the punch or other cutting means. After completion of the first cut on the key blank, the plate 41 is moved upwardly to the limit of movement permitted by the abutment of the roller 44 with the stop button 106, which causes pawl and ratchet actuated transverse displacement of the plate 41 relatively to the upright 26. The plate 41 is then lowered to a key cutting position at which point the guide finger should be in proper alignment with the second transverse position of the depth gauging assembly. The second cut is made and the operative cycle is repeated until the key has been completely cut.

It will be understood that the pawl 104 can be mounted in the oppositely extending direction on the upright 26 so as to effect shifting movement of the plate 41 in the opposite direction to that illustrated in FIG. 13 of the drawings. It is also contemplated to be within the purview of the invention that a pair of oppositely directed pawls 104 be mounted in the recess 103 and that one or the other of the pawls be selectively retained in an inoperative position so that only one of the pair of pawls is operative which will effect the direction of transverse displacement which is desired.

Figure 14:
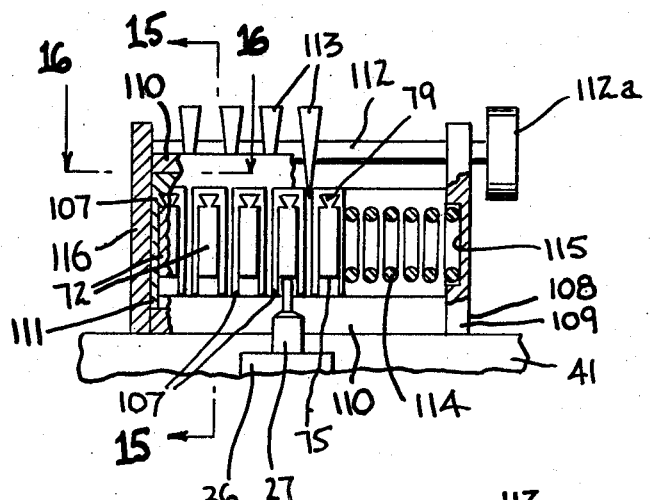
FIG. 14 is a fragmentary elevational view showing the adjustable spacing means of a modified form of my invention.
Figure 15:
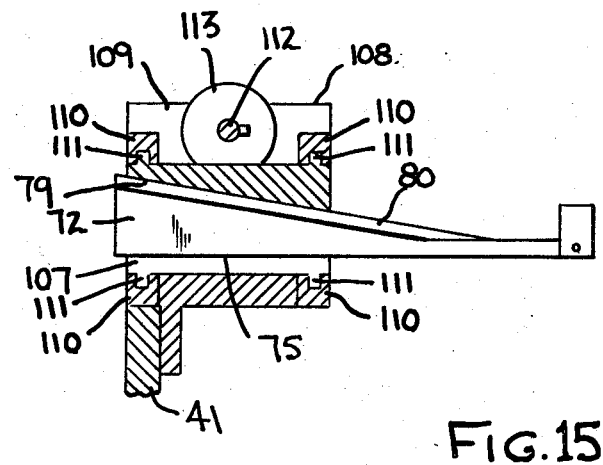
FIG. 15 is a cross-sectional view, taken as indicated on line 15—15 of FIG. 14.
Figure 16:
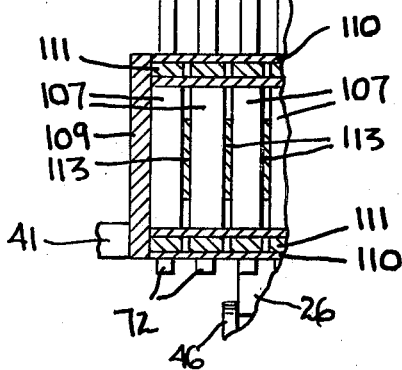
FIG. 16 is a cross-sectional view, taken as indicated on line 16—16 of FIG. 14.

Referring to FIGS. 14–16 of the drawings, I have shown a modified form of depth gauge assembly similar to that previously described in the showing of FIGS. 4 and 5 of the drawings, with means for selectively and adjustably varying the transverse spacing between the individual depth gauge elements so that the depth gauge assembly can be utilized for various styles of key blanks in which the spacing of the cuts, although uniform in each instance, are not necessarily always of the same increment.

In this form of the invention, each of the depth gauge bars 72 is slidably secured in its own individual carrier 107 which is provided with the internal keyway 79 to engage the key 80 of the bar 72. The variable spacing depth gauge assembly 108 includes a plurality of the carriers 107 mounted in a recessed housing 109 which is provided with longitudinally spaced pairs of upper and lower grooves or tracks 110 which are adapted to accommodate corresponding pairs of ribs 111 on each of the carriers 107, which serve to retain each of the carriers against longitudinal displacement relatively to the housing 109 while at the same time permitting transverse guided slidable movement of the carriers relatively to the housing and to each other.

A transversely extending splined shaft 112 is rotatably mounted in the housing 109 above the carriers 107 and is provided at one end thereof with a knob 112a by means of which the shaft 112 can be rotated to any selected angular position. Slidably mounted on shaft 112 for rotation therewith are a plurality of camming spacer discs 113 which may be considered to be face cams whose opposite faces will serve to maintain a predetermined extent of spacing between any adjacent pair of carriers 107 between which the spacer disc 113 is disposed. As indicated, a spacer disc 113 is provided for and extends inbetween each pair of adjacent carriers 107, so that by rotation of the shaft 112 each of the discs 113 will cause adjacent carriers 107 to be separated from each other by the same uniform increment of spacing.

A coil spring 114 is seated in a recess 115 in one side wall of the housing 109 and bears resiliently against its adjacent carrier 107. Inasmuch as the plurality of carriers 107 as well as the plurality of spacer discs 113 are transversely movable on their respective mountings the effect of the spring 114 is to move the discs and carriers toward the opposite wall 116 of the housing 109 to the extent permitted by the inter-positioning of the discs 113 between the carriers.

As the discs are rotated from their minimum spacing position, shown in FIG. 14, they cause the carriers 107 and their attached depth gauging bars 72 to be uniformly moved further apart from each other in opposition to the biasing spring 114. If the discs are counter-rotated, the action of the spring 114 serves to bring the carriers 107 into more closely spaced relationship to the extent permitted by the discs, as previously described. Thus, by providing suitable indicia or markings adjacent to the knob 112a, a predetermined magnitude of spacing between the gauge bars 72 can be selectively obtained by rotation of the shaft 112 and its discs 113.

The depth gauge bars 72 are moved forwardly or rearwardly to selected positions to obtain the desired depth of cut as the guide finger engages the undersurface 75 of each gauge bar sequentially. The depth gauge assembly 108, with its variable spacing means, is secured to the carrier plate 41 of the code cutting device and may be utilized in combination with the stroke-responsive mechanical traversing mechanism previously described, if desired.

In the various forms of my cutting device, it will be apparent that the depth gauging elements can also serve as either indicia or mechanical means for determining or establishing the extent of desired transverse movement of the key blank supporting member between successive cuts. However, other forms of traversing stop means could also be utilized. When a carriage, of the type described in U.S. Patent No. 2,626,663 is utilized with my key cutting machine, the spaced detent arrangement on the carriage can be utilized to establish these successive traversing stops for the cuts, in lieu of or supplementary to any such function of the gauging elements. Furthermore, mechanically responsive traversal could be accomplished by means other than the described pawl and ratchet mechanism. For example, the rack and gear arrangement of said Patent No. 2,626,663 could be so utilized.

Figure 17:
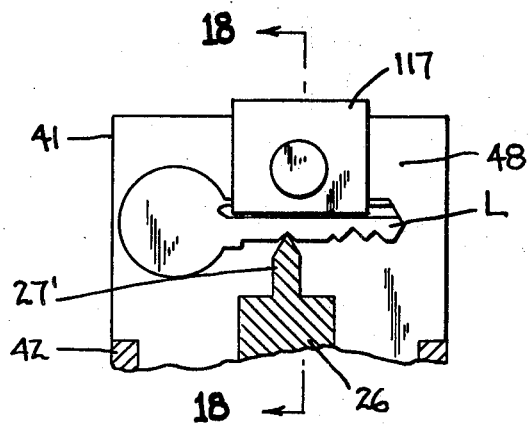
FIG. 17 is a fragmentary elevational view showing the use of an original key as a depth gauging means.
Figure 18:
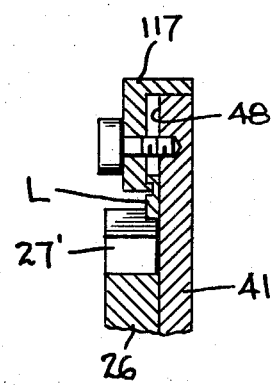
FIG. 18 is a cross-sectional view, taken as indicated on line 18—18 of FIG. 17.

In FIGS. 17 and 18 of the drawing, I have shown means by which the original key can be used as a depth gauge assembly for the cutting of a key blank. In this form of the invention, the previously described forms of depth gauge assemblies are replaced by a key clamping means 117 which is secured to the upper edge of the plate 41 and is comparable in structure and function to the previously described key blank clamping means 51. It is assumed, in this instance, that the original key to be reproduced or duplicated, is available and that no code cutting is therefore necessary. This original key L is clamped in position to the rearward face 48 of the carrier plate 41 by means of the clamping means 117. The cuts on the key L are successively engaged by the guide finger 27' as the plate 41 is shifted transversely. As the guide finger engages each of the cuts on the original key, the cutting punch 35 is actuated to make a cut of corresponding depth on the key blank K. By this means, the cuts of the key L can be duplicated on the key blank K.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In a key cutting device, the combination of a body, a vertically and transversely movable key blank support plate carried by said body, support plate guide means engaging said body and securing said plate thereto to define a path of movement for said plate, a key-cutting means carried by said body and movable into key-cutting engagement with a key blank carried by said plate, a depth-gauge assembly carried by said plate and defining a sequential series of depth-gauging surfaces for the cuts in a key blank, and abutment means carried by said body in the path of movement of said depth-gauge assembly and sequentially engageable with each of said series of gauging surfaces to selectively limit vertical movement of said plate into key-cutting position.

2. A combination as defined in claim 1, wherein said depth-gauge assembly comprises a plurality of transversely disposed gauge elements, each of said elements being independently movable to present a selected depth-gauging surface.

3. A combination as defined in claim 2, wherein each of said gauge elements is rotatable relatively to said plate, and each gauge element presents a plurality of diverse depth-gauging surfaces in response to said rotation.

4. A combination as defined in claim 2, wherein each of said gauge elements is vertically movable relatively to said plate to change the elevation of its depth-gauging surface.

5. A combination as defined in claim 4, wherein each of said gauge elements is a bar presenting a depth-gauging surface, and including camming means engaging each bar to effect the elevation of its gauging surface.

6. A combination as defined in claim 5, wherein said camming means is a rotatable cam element, and including resilient means engaging said bar to yieldably maintain it in engagement with said cam element.

7. A combination as defined in claim 5, wherein said camming means is an inclined plane disposed in the path of movement of said bars.

8. A combination as defined in claim 1, including traversing means carried by said body and engaging said plate and responsive to the vertical movement of said plate for causing transverse movement of said plate relatively to said body.

9. A combination as defined in claim 8, wherein the magnitude of said transverse movement is related to the magnitude of said vertical movement, and including movable abutment means disposed in the path of vertical movement of said plate for adjustably limiting the magnitude of said vertical movement of said plate.

10. A combination as defined in claim 8, wherein said traversing means is a pawl and ratchet assembly interconnecting said body and said plate.

11. A combination as defined in claim 2, including spacer means for maintaining said gauge elements in a selected spaced relationship corresponding to the spacing of the cuts to be made on a selected key blank.

12. A combination as defined in claim 11, wherein said gauge elements are slidably mounted for transverse movement, said spacer means comprises a variable spacer element interposed between each pair of adjacent gauge elements, and including means for setting said spacer element to a selected spacing position.

13. A combination as defined in claim 11, wherein said spacer elements are movably mounted cams disposed in transverse displacing engagement with said gauge elements.

14. A combination as defined in claim 12, wherein said spacer elements are face cams slidably mounted on a common shaft for simultaneous rotation therewith, and including spring means yieldably biasing said spacer elements and said gauge elements toward each other, whereby rotation of said shaft adjustably changes the transverse spacing between said gauge elements.

15. A combination as defined in claim 1, wherein said guide means comprises a roller secured to said plate and transversely movable relatively thereto, and a tracking surface for said roller provided on said body intermediate said roller and said plate for defining a path of vertical movement for said roller.

16. A combination as defined in claim 1, wherein said guide means comprises a rocker arm having one end thereof pivotally secured to said plate and transversely movable relatively thereto, and said rocker arm having the other end thereof pivotally secured to a portion of said body, whereby said plate is pivotally movable relatively to said body about both said axes of pivotal securement of said rocker arm.

References Cited

UNITED STATES PATENTS

| | | | |
|---|---|---|---|
| 1,995,798 | 3/1935 | Curtis | 30—131 |
| 2,626,663 | 1/1953 | Abrams | 30—131 |
| 2,731,087 | 1/1956 | Cole | 30—131 |

GERALD A. DOST, Primary Examiner

U.S. Cl. X.R.

83—917; 90—13.05